United States Patent
Talty et al.

(10) Patent No.: US 8,626,144 B2
(45) Date of Patent: Jan. 7, 2014

(54) BLUETOOTH LOW ENERGY APPROACH DETECTIONS THROUGH VEHICLE PAIRED CAPABLE DEVICES

(75) Inventors: Timothy J. Talty, Beverly Hills, MI (US); Robert A. Hrabak, West Bloomfield, MI (US); Jonathan L. Oakes, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/439,952

(22) Filed: Apr. 5, 2012

(65) Prior Publication Data

US 2013/0017816 A1     Jan. 17, 2013

Related U.S. Application Data

(60) Provisional application No. 61/507,360, filed on Jul. 13, 2011.

(51) Int. Cl.
*H04M 3/00* (2006.01)

(52) U.S. Cl.
USPC ........ 455/418; 455/41.2; 455/434; 455/435.1

(58) Field of Classification Search
USPC ............. 455/418–420, 41.1, 41.2, 41.3, 455/423–424, 426.1, 434, 435.1, 435.2, 455/435.3
See application file for complete search history.

(56) References Cited

U.S. PATENT DOCUMENTS

| | | | |
|---|---|---|---|
| 6,321,348 B1 * | 11/2001 | Kobata | 714/37 |
| 2006/0256763 A1 * | 11/2006 | Nguyen et al. | 370/338 |
| 2010/0302979 A1 * | 12/2010 | Reunamaki | 370/311 |
| 2011/0021143 A1 * | 1/2011 | Kapur et al. | 455/41.2 |
| 2011/0210820 A1 * | 9/2011 | Talty et al. | 340/5.8 |
| 2011/0210830 A1 * | 9/2011 | Talty et al. | 340/10.51 |
| 2011/0210831 A1 * | 9/2011 | Talty et al. | 340/10.51 |
| 2012/0007712 A1 * | 1/2012 | Tung | 340/5.72 |
| 2012/0158213 A1 * | 6/2012 | Talty et al. | 701/2 |

\* cited by examiner

*Primary Examiner* — San Htun
*Assistant Examiner* — Magdi Elhag

(57) ABSTRACT

A method of enabling communications between a Bluetooth low energy master communication device in a vehicle and a slave communication device. The slave communication device is successfully paired with a Bluetooth high energy master communication device in the vehicle. An identifier of the slave communication device is stored when it is successfully paired with the Bluetooth high energy master communication device. The Bluetooth low energy master communication device identifies an advertising event broadcast by the slave communication device. The advertising event relates to a notification by the slave communication device of the availability of its services. A determination is made whether the identifier of the slave communication device matches the stored identifier. Wireless communications between the Bluetooth low energy master communication device and the slave communication device is autonomously established without a manual pairing operation in response to an identifier of the slave communication device matching the stored identifier.

20 Claims, 2 Drawing Sheets

BLUETOOTH LOW ENERGY APPROACH DETECTIONS THROUGH VEHICLE PAIRED CAPABLE DEVICES

BACKGROUND OF INVENTION

An embodiment relates generally to external device integration within a vehicle.

Many consumer electronic devices are equipped with Bluetooth capabilities that allow two devices to automatically sync and communicate with one another after each of the devices are paired by a user. Bluetooth is an open wireless technology standard that allows devices to communicate within one another over short distances (e.g., less than 30 meters). Bluetooth may be used to automatically link two wireless devices such as a personal device (e.g., phone, pda) to another wireless communicating device (e.g., computer, headset) for automatically downloading files, messages, music, video, and various other applications.

Bluetooth low energy (BLE) is a feature of Bluetooth wireless technology directed to low power applications for wireless devices. Such devices may be used within a short range (e.g., less than 50 meters). Devices that may use BLE will only consume a fraction of the power of conventional Bluetooth enabled devices. This will allow the consumer electronic devices to expand their longevity of operation prior to having to recharge the battery (e.g., a year between recharging or replacing). As a result, sensing devices can remain continuously "on" as opposed to cycling between polling mode and sleep mode.

Despite BLE operating in the same spectrum as Bluetooth, BLE operates on a different set of channels and requires different hardware. Consumers have to pair their consumer electronic devices to BLE modems separately from other types of Bluetooth pairings. Packaging locations of the chipsets currently within the vehicle may not provide sufficient area coverage for operation needed. For example, vehicle-based systems have current chipsets/modems designated for conventional Bluetooth operations such as infotainment or handsfree phone systems that are limited primarily to the interior passenger compartment. Systems that utilize BLE operations, such as approach detection systems, need to provide for external vehicle coverage. As a result, manufacturers of vehicles will most likely have to construct and package a new module that must be able to recognize an approaching BLE customer electronic device. A substantially same procedure as a conventional Bluetooth pairing procedure would be required for a new module. For vehicles that already have a Bluetooth node to enable Bluetooth devices, the requirement of second Bluetooth pairing operation between their portable device and the vehicle would confuse the user. For example, a customer establishing a pairing for a personal device with an Infotainment or Telematics system would have to perform basically the same operation for pairing the personal device with a BLE application which would leave the user confused as to the rationale for having to pair their personal device multiple times. The result may be that the user only pairs the portable device to the conventional Bluetooth node not fully understanding why a second pairing operation is needed. This may lead to customer complaints and unwarranted service requests.

SUMMARY OF INVENTION

An advantage of an embodiment is a reduction of complexity, packaging, and cost of adding a Bluetooth low-energy (BLE) chipset/modem for pairing a BLE-enabled portable device with a BLE-enabled application. The system generates a list of identifiers of previously paired conventional Bluetooth-enabled portable devices to the BLE-enabled application. The list is transmitted to the BLE application, wherein the BLE application compares a respective identifier of a respect portable device broadcasting an inquiry to the list of identifiers to determine whether a match is present. If a match is present, the respective portable device and the BLE-enabled application may continue further communications for performing mutual authentication. The system also eliminates the requirement of a user having to perform a manual pairing of the portable device and the BLE-enabled application.

An embodiment contemplates a method of enabling communications between a Bluetooth Low Energy (BLE) master communication device in a vehicle and a slave communication device. The slave communication device having both Bluetooth low energy enabled and conventional Bluetooth enabled (conventional Bluetooth may be referred to as Bluetooth high energy herein for the purposes of showing that the conventional Bluetooth operates at a higher power level relative to BLE). The slave communication device is successfully paired with a Bluetooth high energy master communication device in the vehicle such as the infotainment or telematics systems. An identifier of the slave communication device is stored in a memory associated with at least the Bluetooth high energy master communication device when it is successfully paired with the Bluetooth high energy master communication device. The Bluetooth low energy master communication device identifies an advertising event broadcast by the slave communication device. The advertising event relates to a notification by the slave communication device of the availability of its services. Verification is made whether the identifier of the slave communication device matches the stored identifier. Wireless communications are autonomously established between the Bluetooth low energy master communication device and the slave communication device without a manual pairing operation in response to an identifier of the slave communication device matching the stored identifier.

An embodiment contemplates a Bluetooth low energy communication system. A slave communication device is both Bluetooth low energy enabled and Bluetooth high energy enabled. The slave communication device includes an identifier used to authenticate the slave communication device during Bluetooth communications. A Bluetooth high energy master communication device communicates with the slave communication device. The Bluetooth high energy master communication device stores the identifier of the slave communication device in response to a successful pairing between the Bluetooth high energy master communication device and the slave communication device. A Bluetooth low energy master communication device communicates with the slave communication device. An advertising event of the slave communication device is identified by the Bluetooth low energy master communication device. The identifier of the slave communication device is compared with the stored identifier to determine if a match is present. Communication is autonomously enabled between the Bluetooth low energy master communication device and the slave communication device in response to the identifier of the slave communication device matching the stored identifier stored.

DETAILED DESCRIPTION

Figure 1:
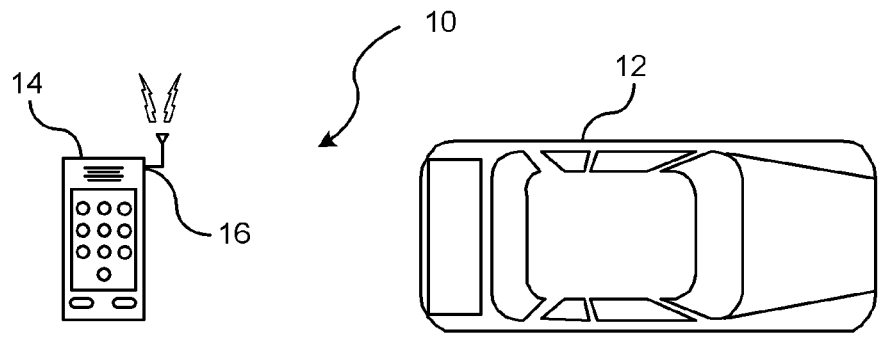
FIG. 1 is an illustration of a vehicle communication system.

There is shown generally in FIG. 1 an illustration of a vehicle communication system 10 including a vehicle 12 and a portable device 14. The portable device 14 is a consumer electronic device carried by a user of the vehicle 12. The portable device 14 may be a device that is dedicated for communicating with the vehicle 12, such as a key fob. The portable device 14 may also be a device where a primary function of the device is other than vehicle communications, such as a smartphone.

The portable device 14 includes a transceiver 16, or transmitter and receiver, for transmitting and receiving signals. The portable device 14 includes Bluetooth wireless technology which allows for autonomous communications with other wireless devices. The portable device 14 utilizes conventional Bluetooth wireless technology and Bluetooth low energy (BLE) wireless technology. BLE consumes a very small portion of the power of conventional Bluetooth enabled devices and therefore is desirable for low power applications. Conventional Bluetooth may be referred to as Bluetooth high energy herein for the purposes of showing that the conventional Bluetooth operates at a higher power level relative to BLE.

The vehicle 12 includes at least one communication module for communicating with the portable device 14 via conventional Bluetooth. The communication module includes a transceiver, or transmitter and receiver. The vehicle 12 also utilizes conventional Bluetooth and BLE wireless technology for enabling a pairing between the communication module and the portable device 14. Bluetooth wireless technology allows a device to interpret respective Bluetooth profiles. The Bluetooth profiles specify applications and general operating behaviors so that Bluetooth enabled devices can autonomously communicate with other Bluetooth enabled devices and exchange information without a user initiating the communication. The Bluetooth profiles utilize settings to parameterize and control the communications between two Bluetooth enabled devices from the commencement of the communication. The Bluetooth profiles are efficient in saving time without having to repeatedly transmit parameters each time a previously established Bluetooth enabled device is re-engaged for communication. The linking of two devices is known as pairing. When initiating a link between two Bluetooth enabled devices for the first time, a user is instructed to follow a respective procedure which will establish a communication link between each device. During the procedure, the devices will exchange their Bluetooth addresses and possibly other information. Each Bluetooth device has a unique device address that is commonly referred to as the device Bluetooth Address. The Bluetooth addresses, and possibly other information, are stored so that when the two Bluetooth devices initiate communication thereafter, the respective Bluetooth devices will automatically establish a communication link without having to pair again. As a result, one of the devices will transmit advertisement events, which are basically broadcast inquiries for determining if any device in the vicinity is an already paired device that desires to utilize its services; however, a response to the communication will only be autonomously performed if the two enabled Bluetooth devices have previously been paired.

Vehicles currently utilize Bluetooth for various applications such as HMI modules, OnStar, or Faceplate Radio. The addition of BLE wireless technology into the vehicle would require that significant changes be made to the existing modules. Moreover, current packaging locations of the HMI, Onstar, and Faceplate Radios do not provide sufficient external vehicle coverage, and the obvious solution would be to package in an area conducive for providing external coverage.

Figure 2:
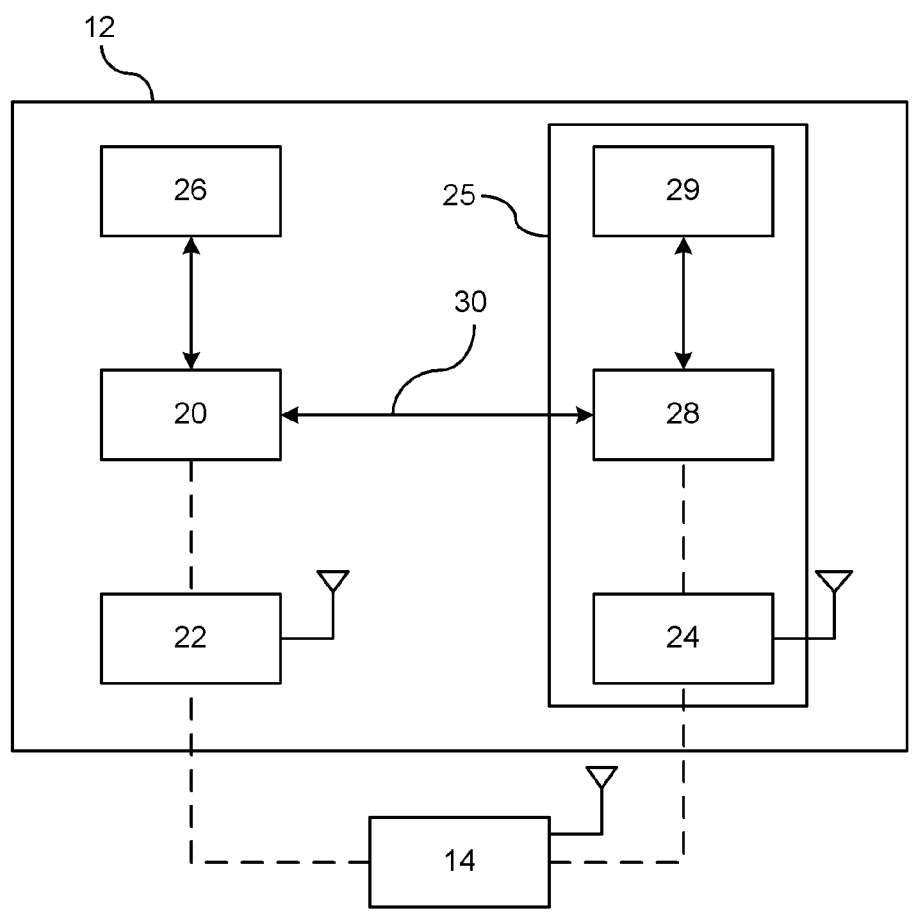
FIG. 2 is a block diagram of a BLE enablement system between wireless devices.

FIG. 2 illustrates a block diagram for the BLE enablement system for paired electronic devices. The portable device 14, (e.g., smartphone) is in wireless communication with the vehicle 12. Moreover, the vehicle 12 includes an application module 20, such as infotainment and telematics system, that the portable device 14 has previously paired with using conventional Bluetooth. The application module 20 provides a display and controls so applications in the portable device 14 may be actuated utilizing a human machine interface of the infotainment and telematics system (e.g., voice recognition software, sound system and navigation screen). Functions that may be actuated include, but are not limited to, phone calls, music, navigation, texting, email, traffic advisories, and other connected-vehicle functions. The application module 20 may also allow a user to configure the entertainment and information display as they deem proper as opposed to a mass market radio.

The vehicle 12 includes a chipset/module for establishing a conventional Bluetooth node 22 and a BLE wireless technology node 24. It should be understood that the respective nodes may be standalone chipsets/modems, or may be integrated as part of a transmitter/receiver, or any other circuit.

The Bluetooth node 22 provides a pairing of the portable device 14 with the application module 20. After the pairing is authorized, the Bluetooth node 22 will automatically establish a communication between the paired devices for communicating messages and transferring data whenever each device is in communication range of one another.

The BLE node 24 is integrated within a BLE module 25 and allows the BLE module 25 to communicate with other BLE wireless devices. As shown in this illustration, the BLE node 24 provides an autonomous communication link with the portable device 14 or any other low energy devices that utilize BLE technology. However, performing an initial pairing with a BLE application would typically require that the user pair the portable device 14 with a BLE application regardless of whether the user has already performed a same pairing operation with the Bluetooth module 20. This can be confusing for the user of the vehicle and the user may not understand why this duplicate operation is required.

To avoid confusion of having the user perform essentially duplicate procedures, the embodiments described herein avoid having to execute a second pairing of the portable device 14 within an application module by utilizing the previous successful pairing of the respective devices executed via the conventional Bluetooth node 22. When the portable device 14 and the application module 20 successfully execute a pairing, the addresses of both devices are exchanged and stored as a white list 26 in a memory associated with the application module 20. The memory may be the memory of the processor of the application module 20, standalone memory unit, or a shared memory unit. The white list 26 is a comprehensive listing of paired addresses of devices that have been authenticated for communication via the conventional Bluetooth node 22. The application module 20, or any other vehicle application that maintains the white list 26, communicates the paired addresses to a BLE module 25, such as an approach detection module (ADM), for establishing communication with the portable device via the BLE node 22. The white list 26 may contain the address or any other identifier of the portable device 14. In this example, the BLE module 25 is an ADM module that detects the presence of a portable device 14 as it approaches the vehicle 12. The ADM may be a system that senses the portable device 14 approaching the vehicle, such as a passive entry passive start (PEPS) system that interrogates or polls an area immediately surrounding the vehicle, or may be a system where vehicle data services of a vehicle are enabled by low power FM transmissions of an approaching portable device. It should be understood the above examples are only one of a plurality of BLE applications.

The white list 26 is transmitted by the application module 20 to a processor 28 of the BLE module 25 using a vehicle LAN line 30. Therefore, whenever a portable device is successfully paired to a vehicle application via the Bluetooth node 22, the white list 26 is updated and transmitted via the vehicle LAN line 30 to the BLE module 25. The white list 26 may be transmitted on a periodic basis, or transmitted upon vehicle operation occurring (e.g., engine turning off), or transmitted immediately when the white list 26 is updated. The white list 26 of the application module 20 is then replicated at the BLE module 25 and stored as a white list 29 in a memory associated with the BLE module 25. The memory may be the memory of the processor 28, standalone memory unit, or a shared memory unit. The replicated white list 29 is a list of approved wireless devices that may be paired for communication with the BLE module 25. As a result, the application module 20 and BLE module 25 have identical white lists.

The BLE module 25 when sensing an advertising event from the portable device 14 will check the white list 29 to determine if the address of the portable device 14 is present. If the address is present, the BLE module 25 allows further communications with the portable device 14 utilizing the BLE node 24 to perform mutual authentication between the communicating devices. After a successful mutual authentication, each of the devices will autonomously sync to one another utilizing the BLE node 24 when both devices are within communication range of one another. If the address of the portable device 14 is not on the white list 29, then the communications from the portable device 14 are ignored.

Figure 3:
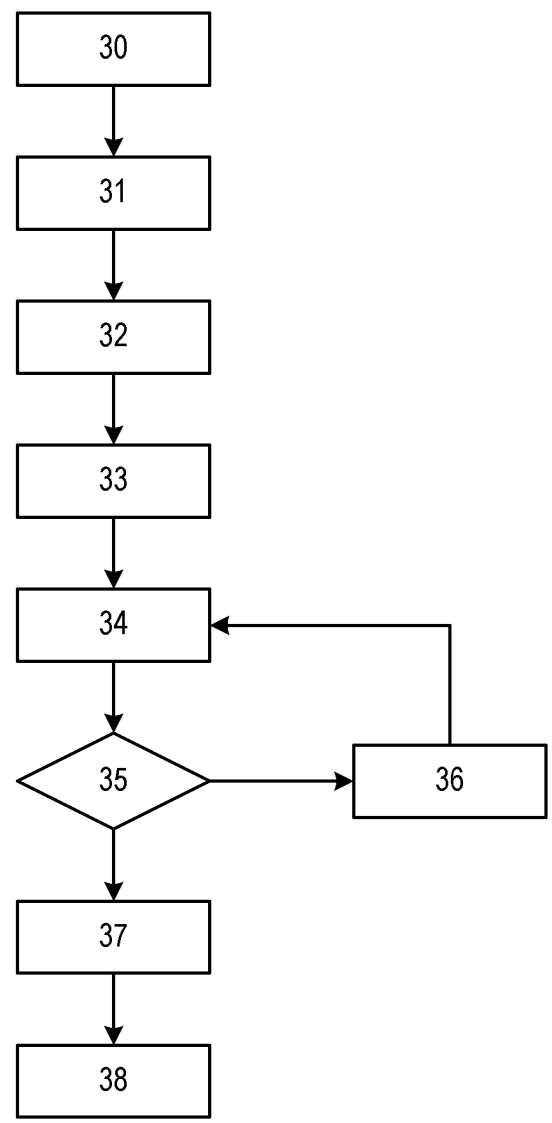
FIG. 3 is a method for pairing a portable device to a vehicle BLE wireless device or system.

FIG. 3 illustrates a method of pairing a portable device to a vehicle BLE application.

In step 30, a user of the vehicle initiates a pairing between a Bluetooth BLE portable device and a vehicle-based Bluetooth device/system of the vehicle. The pairing is executed through the Bluetooth node of the vehicle and is enabled for conventional Bluetooth devices. The initiating of the pairing typically demands that that user enter input commands for initiating the process. Such commands may be depressing one or more buttons, or possibly inputting a voice command to initiate the pairing.

In step 31, a successful pairing is performed and the portable device is enabled for Bluetooth operations.

In step 32, the pairing information, such as the Bluetooth address or other information, is transmitted to BLE application, such as the ADM, over a vehicle LAN line. The pairing may be transmitted on a periodic basis where the white list is periodically updated or the pairing may be transmitted whenever a new pairing is generated. Alternatively, the pairing may be transmitted upon the occurrence of a vehicle operation, such as an engine off or engine start operation, or some other vehicle operation. The BLE application stores the pairing as part of a white list for future enabling of the portable device for BLE operations.

In step 33, the portable device broadcasts an advertising event to a surrounding area. The advertising event broadcast by the portable device is a broadcast notifying any listening devices of the availability of its services.

In step 34, the BLE application senses the portable device in response to the ADM receiving the advertising event.

In step 35, the BLE application determines if the address of the portable device is listed on the white list. If the determination is made that the address of the portable device is listed on the white list, then the routine proceeds to step 37; otherwise, the routine proceeds to step 36.

In step 36, the BLE application ignores the portable device if the address is not listed on the white list. The routine then proceeds back to step 34 where the BLE application monitors for a next advertising event.

In step 37, the BLE application communicates its address or other validation information to the portable device for mutual authentication in response to the address of the portable device being included on the white list.

In step 38, the BLE application and portable device are enabled for communication via the BLE node. Once the network is formed between the two communicating devices, the BLE application becomes the master and the portable device becomes the slave in a piconet network. Therefore, the BLE application and the portable device are autonomously enabled for wirelessly communicating without user intervention.

As a result, an advantage of the embodiments described herein is that an additional pairing process is not required which reduces the overall expense, complexity, and packing concerns of implementing a new module.

It should be understood that although the embodiments described herein are vehicle-based, the invention may be utilized with any BLE portable devices and BLE applications that are non-automotive. The term vehicle utilized herein may be interpreted as a same structure, system, or module if utilized in a non-automotive environment.

While certain embodiments of the present invention have been described in detail, those familiar with the art to which this invention relates will recognize various alternative designs and embodiments for practicing the invention as defined by the following claims.

What is claimed is:

1. A method of enabling communications between a Bluetooth low energy master communication device in a vehicle and a slave communication device, the slave communication device being both Bluetooth low energy enabled and Bluetooth high energy enabled and includes an identifier used to authenticate the slave communication device during Bluetooth communications, the method comprising the steps of:

successfully pairing the slave communication device with a Bluetooth high energy master communication device in the vehicle, the slave communication device capable of simultaneously communicating with the Bluetooth high energy master communication device and the Bluetooth low energy master communication device;

storing in a memory associated with at least the Bluetooth high energy master communication device the identifier of the slave communication device when it is successfully paired with the Bluetooth high energy master communication device;

communicating the identifier to the Bluetooth low energy master communication device;

the Bluetooth low energy master communication device identifying an advertising event broadcast by the slave communication device, the advertising event relating to a notification by the slave communication device of the availability of its services;

verifying whether the identifier of the slave communication device matches the stored identifier; and autonomously establishing wireless communications between the Bluetooth low energy master communication device and the slave communication device without a manual pairing operation in response to an identifier of the slave communication device matching the stored identifier.

2. The method of claim 1 wherein the identifier is maintained on an approved identifier list in a memory of an application module of the vehicle, wherein the approved identifier list is a comprehensive listing of paired addresses of devices that have been authenticated for communication with the Bluetooth high energy master communication device.

3. The method of claim 2 wherein the approved identifier list is transmitted from the Bluetooth high energy master communication device to the Bluetooth low energy master communication device.

4. The method of claim 3 wherein the approved identifier list is immediately transmitted to the Bluetooth low energy master communication device each time the approved identifier list is updated.

5. The method of claim 3 wherein the approved identifier list is transmitted to the Bluetooth low energy master communication device on a periodic basis.

6. The method of claim 3 wherein the approved identifier list is transmitted to the Bluetooth low energy master communication device upon an initiation of a predetermined event.

7. The method of claim 3 wherein the approved identifier list is replicated by the Bluetooth low energy master communication device and stored in a memory module associated at least with the Bluetooth low energy master communication device.

8. The method of claim 3 wherein the approved identifier list is transmitted over a LAN line.

9. The method of claim 1 wherein if the identifier of the slave communication device is not on the approved identifier list, communication between the Bluetooth low energy master communication device and the slave communication device is not enabled.

10. The method of claim 1 wherein Bluetooth high energy master communication device and Bluetooth low energy master communication device are vehicle-based devices.

11. A Bluetooth low energy communication system comprising:

a slave communication device being both Bluetooth low energy enabled and Bluetooth high energy enabled, the slave communication device including an identifier used to authenticate the slave communication device during Bluetooth communications;

a Bluetooth high energy master communication device in a vehicle communicating with the slave communication device, the Bluetooth high energy master communication device storing the identifier of the slave communication device in response to a successful pairing between the Bluetooth high energy master communication device and the slave communication device; and a Bluetooth low energy master communication device in the vehicle communicating with the slave communication device, the slave communication device capable of simultaneously communicating with the Bluetooth high energy master communication device and the Bluetooth low energy master communication device, wherein the Bluetooth master communication device communicates the identifier to the Bluetooth low energy master communication device, and wherein an advertising event of the slave communication device is identified by the Bluetooth low energy master communication device, wherein the identifier of the slave communication device is compared with the stored identifier to determine if a match is present, and wherein communication is autonomously enabled between the Bluetooth low energy master communication device and the slave communication device in response to the identifier of the slave communication device matching the stored identifier.

12. The system of claim 11 further comprising an approved identifier list in a memory of an application module of the vehicle for maintaining a comprehensive listing of paired addresses of slave communication devices that have been authenticated for communication with the Bluetooth high energy master communication device.

13. The system of claim 12 further comprising a LAN line for communicating the approved identifier list from the Bluetooth high energy master communication device to the Bluetooth low energy master communication device.

14. The system of claim 13 wherein the approved identifier list is immediately transmitted to the Bluetooth low energy master communication device each time the approved identifier list is updated.

15. The system of claim 13 wherein the approved identifier list is transmitted to the Bluetooth low energy master communication device upon an initiation of a predetermined event.

16. The system of claim 13 wherein the approved identifier list is transmitted to the Bluetooth low energy master communication device upon an event occurring.

17. The system of claim 13 further comprising a memory module associated with the Bluetooth low energy master communication device, wherein the approved identifier list initially maintained by the Bluetooth high energy master communication device is transmitted to the Bluetooth low energy master device, and wherein approved identifier list is replicated by the Bluetooth low energy master communication device and stored in the memory module.

18. The system of claim 11 wherein the Bluetooth high energy master communication device and the Bluetooth low energy master communication device are vehicle-based devices.

19. The system of claim 11 wherein the Bluetooth low energy master device includes an approach detection module.

20. The system of claim 11 wherein the portable device includes a smartphone.

* * * * *